United States Patent
Yamamoto

(10) Patent No.: US 10,682,999 B2
(45) Date of Patent: Jun. 16, 2020

(54) VEHICLE BRAKE SYSTEM

(71) Applicant: TOYOTA JIDOSHA KABUSHIKI KAISHA, Toyota-shi, Aichi-ken (JP)

(72) Inventor: Naoki Yamamoto, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 126 days.

(21) Appl. No.: 15/956,917

(22) Filed: Apr. 19, 2018

(65) Prior Publication Data

US 2018/0326965 A1   Nov. 15, 2018

(30) Foreign Application Priority Data

May 11, 2017   (JP) ................. 2017-095025

(51) Int. Cl.
| | | |
|---|---|---|
| *B60T 17/18* | (2006.01) | |
| *B60T 8/40* | (2006.01) | |
| *B60T 7/04* | (2006.01) | |
| *B60T 13/14* | (2006.01) | |
| *B60T 13/68* | (2006.01) | |
| *B60T 13/74* | (2006.01) | |
| *B60T 8/94* | (2006.01) | |

(52) U.S. Cl.
CPC ............. *B60T 17/18* (2013.01); *B60T 7/042* (2013.01); *B60T 8/4059* (2013.01); *B60T 8/4081* (2013.01); *B60T 13/142* (2013.01); *B60T 13/686* (2013.01); *B60T 13/741* (2013.01); *B60T 8/94* (2013.01); *B60T 2220/04* (2013.01); *B60T 2270/402* (2013.01); *B60T 2270/403* (2013.01)

(58) Field of Classification Search
CPC ........ B60T 17/18; B60T 7/042; B60T 13/142; B60T 2270/402; B60T 13/741; B60T 2220/04; B60T 2270/403; B60T 13/686; B60T 8/4059; B60T 8/4081; B60T 8/94
USPC ................ 303/3, 10, 11, 15, 122.04, 122.05, 303/122.09, 152, 155, 113.4, 20; 701/70, 701/76, 78

See application file for complete search history.

(56) References Cited

U.S. PATENT DOCUMENTS

| | | | |
|---|---|---|---|
| 2008/0054716 A1* | 3/2008 | Sato | B60T 1/10 303/16 |
| 2011/0241417 A1* | 10/2011 | Miyazaki | B60T 7/042 303/2 |
| 2017/0232849 A1* | 8/2017 | Yamamoto | B60L 7/26 303/15 |

FOREIGN PATENT DOCUMENTS

JP    2011-051494 A    3/2011

* cited by examiner

*Primary Examiner* — Pamela Rodriguez
(74) *Attorney, Agent, or Firm* — Sughrue Mion, PLLC

(57) ABSTRACT

A vehicle brake system including a hydraulic brake device having two systems and configured to generate a braking force, wherein, in a failure condition of one of the two systems, one of the following two operation modes of the hydraulic brake device is selectively established: (a) a two-wheel mode in which master shut-off valves shut respective master fluid passages and a braking force that depends on a pressure of a working fluid supplied from a master cylinder is generated for each of right and left wheels; and (b) a one-wheel mode in which one of the master shut-off valves corresponding to the other of the two systems shuts off the corresponding master fluid passage and a braking force that depends on the working fluid supplied by a controlled-pressure supply device is generated for only one of the right and left wheels that corresponds to the other of the two systems.

7 Claims, 6 Drawing Sheets

VEHICLE BRAKE SYSTEM

CROSS REFERENCE TO RELATED APPLICATION

The present application claims priority from Japanese Patent Application No. 2017-095025, which was filed on May 11, 2017, the disclosure of which is herein incorporated by reference in its entirety.

BACKGROUND

Technical Field

The following disclosure relates to a brake system for a vehicle installed on the vehicle.

Description of Related Art

A hydraulic brake device as described in Patent Literature 1 (Japanese Patent Application Publication No. 2011-51494) is known as one example of a hydraulic brake device configured to generate a braking force that depends on a pressure of the working fluid. Specifically, the known hydraulic brake device includes two systems for generating the braking forces for mutually different wheels. In a normal condition, the working fluid is supplied to the wheel brakes of both of the two systems not from a master cylinder but from a controlled-pressure supply device which has a high-pressure source and which is configured to control a pressure of the working fluid from the high-pressure source, so that the braking force is generated for each wheel. In the hydraulic brake device, in an instance where any one of the two systems fails to operate, the working fluid is supplied from the controlled-pressure supply device to the wheel brake of the other of the two systems which is not in failure while the working fluid pressurized by the master cylinder in dependence on a brake operation member by a driver is supplied to the wheel brake which is in failure.

SUMMARY

Meanwhile, it is proposed that the high-pressure source and the controlled-pressure supply device be used in common to the two systems of the hydraulic brake device described above for simplification of the hydraulic brake device. In such a hydraulic brake device, a case is considered in which one of the two systems fails to operate. In this case, if the braking force is generated in the failed system by the working fluid pressurized by the master cylinder while the braking force is generated in the non-failed system by the working fluid supplied from the controlled-pressure supply device, there may be a risk that the pressure of the working fluid pressurized by the controlled-pressure supply device acts in the master cylinder since the controlled-pressure supply device is common to the two systems. This may cause a deterioration in an operation feeling of the brake operation member as felt by a driver. That is, the vehicle brake system including such a hydraulic brake device is not necessarily satisfactory in terms of utility. Accordingly, the present disclosure relates to a vehicle brake system having high utility.

In one aspect of the present disclosure, a vehicle brake system includes a hydraulic brake device which includes two systems and which has a controlled-pressure supply device configured to supply, to wheel brakes, a working fluid from a high-pressure source while controlling a pressure of the working fluid. When one of the two systems of the hydraulic brake device is in failure, one of the following two operation modes of the hydraulic brake device is selectively established: (a) a two-wheel mode in which the hydraulic brake device generates, for the wheel brakes of both of the two systems, the braking force that depends on a pressure of the working fluid supplied from a master cylinder in dependence on a force applied to a brake operation member by a driver; and (b) a one-wheel mode in which the hydraulic brake device generates the braking force that depends on a pressure of the working fluid supplied from the controlled-pressure supply device for only one of the wheel brakes that corresponds to the other of the two systems which is not in failure.

Advantageous Effects

In the vehicle brake system according to the present disclosure, when any one of the two systems is in failure, the braking force based on the driver's brake operation and the braking force based on the pressure of the working fluid from the controlled-pressure supply device are not generated at the same time. Thus, the operation feeling of the brake operation member is not deteriorated due to an influence of the pressure of the working fluid pressurized by the controlled-pressure supply device, so that the present vehicle brake system has high utility.

Forms of the Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

(1) A brake system for a vehicle installed on the vehicle, the brake system comprising a brake operation member to be operated by a driver and a hydraulic brake device configured to generate a braking force that depends on a pressure of a working fluid in accordance with an operation of the brake operation member, wherein the hydraulic brake device includes two systems respectively corresponding to a right wheel and a left wheel, wherein the hydraulic brake device includes:
   a pair of wheel brakes which are provided respectively for the right wheel and the left wheel and which are configured to generate the braking force in accordance with a pressure of the working fluid supplied thereto;
   a master cylinder configured to pressurize the working fluid by a force applied to the brake operation member by the driver;
   a pair of master fluid passages through which the working fluid pressurized by the master cylinder is supplied to the respective wheel brakes;

a pair of master shut-off valves which are provided respectively for the master fluid passages so as to shut off flows of the working fluid through the respective master fluid passages; and a controlled-pressure supply device including a high-pressure source and configured to supply, to the wheel brakes, the working fluid from the high-pressure source while controlling the pressure of the working fluid, wherein, in a normal condition, the master shut-off valves shut off the flows of the working fluid through the respective master fluid passages and the hydraulic brake device generates, for each of the right wheel and the left wheel, the braking force that depends on the working fluid supplied by the controlled-pressure supply device, and wherein, in a failure condition of one of the two systems, one of the following two operation modes of the hydraulic brake device is selectively established: (a) a two-wheel mode in which the master shut-off valves allow the flows of the working fluid through the respective master fluid passages and the hydraulic brake device generates, for each of the right wheel and the left wheel, the braking force that depends on a pressure of the working fluid supplied from the master cylinder; and (b) a one-wheel mode in which one of the master shut-off valves that corresponds to the other of the two systems shuts off the flow of the working fluid through a corresponding one of the master fluid passages and the hydraulic brake device generates the braking force that depends on the working fluid supplied by the controlled-pressure supply device for only one of the right wheel and the left wheel that corresponds to the other of the two systems.

A hydraulic brake device is considered which is configured such that, in the normal condition, namely, when the hydraulic brake device is not in failure, the master shut-off valves are closed and the wheel brakes generate the braking force in accordance with a pressure of the working fluid supplied from the controlled-pressure supply device. When one of the two systems is in failure in such a hydraulic brake device, the hydraulic brake device generally operates as follows from the viewpoint of failsafe. That is, the master shut-off valves are opened, and there is supplied, at least to the wheel brake of the failed system, the working fluid pressurized by the master cylinder in dependence on a force by which the driver operates the brake operation member, so that the wheel brake of the failed system generates the braking force. When the hydraulic brake device thus operates, it may be considered that, in the non-failed system, the master shut-off valve is closed and the working fluid is supplied to the wheel brake from the controlled-pressure supply device, so as to permit the wheel brake to generate the braking force. In the thus configured hydraulic brake device, in an instance where the controlled-pressure supply device is configured to supply, in the normal condition, the working fluid to both of the wheel brakes, the pressure of the working fluid to be supplied to the wheel brake of the non-failed system may act on the master cylinder through the master shut-off valve of the failed system which is placed in a valve open state, depending upon the configuration of the controlled-pressure supply device. The action of the pressure of the working fluid may undesirably cause discomfort with respect to the brake operation when the driver is operating the brake operation member, namely, when the driver is performing the brake operation.

According to this form, when one of the two systems is in failure, one of the two-wheel mode and the one-wheel mode is selectively established. That is, even when any one of the two systems is in failure, the braking force based on the driver's brake operation and the braking force based on the pressure of the working fluid from the controlled-pressure supply device are not generated at the same time. In other words, the two-wheel mode may be established when the driver is performing the brake operation while the one-wheel mode may be established when the driver is not performing the brake operation, for instance. It is thus possible to obviate a deterioration in the operation feeling of brake operation member due to the influence of the pressure of the working fluid pressurized by the controlled-pressure supply device.

The "failure condition of the one of the two systems" in this form is not limited to a particular failure condition, but may be an electric failure, for instance. Specifically, examples of the failure include a failure in which electric power cannot be supplied to a constituent component of one of the two systems of the controlled-pressure supply device which operates by electric power supplied thereto, a failure in which the constituent component cannot operate even electric power is supplied thereto. More specifically, the examples of the failure include a case in which, where a pair of master shut-off valves are normally-opened electromagnetic open/close valves, electric power cannot be supplied to one of the two master shut-off valves and a case in which power supply function to various electromagnetic valves of one of the two systems is disabled. (The normally-opened open/close valve is a valve which is in a valve open state when not energized.)

In the one-wheel mode, in an instance where the master shut-off valve in the failed system is operable and power supply function to that master shut-off valve is not in failure, the master shut-off valve in question may shut off the flow of the working fluid through the master fluid passage in the failed system. That is, according to this form, the flows of the working fluid through the master fluid passages may be shut off by the respective master shut-off valves in the one-wheel mode.

(2) The vehicle brake system according to the form (1), wherein, in the failure condition of the one of the two systems, the two-wheel mode is established when the driver operates the brake operation member while the one-wheel mode is established when a brake request not based on an intension of the driver is made.

There has been recently studied execution of an automatic brake in an emergency brake or in control for keeping a distance between an own vehicle and a preceding vehicle which is travelling ahead of the own vehicle. The "brake request not based on an intension of the driver" in this form means a brake request in the automatic brake, for instance. When the automatic brake is executed, the braking force needs to be generated even though the driver does not perform the brake operation. According to this form, the one-wheel mode is established when the automatic brake is executed, making it possible to obtain the braking force in the non-failed system even though the brake operation is not performed by the driver. As explained above, the brake operation is not performed when the automatic brake is executed. Thus, even when the one-wheel mode is established, the discomfort with respect to the brake operation is not caused.

(3) The vehicle brake system according to the form (2), wherein, when the driver operates the brake operation member in a state in which the one-wheel mode is established, the two-wheel mode is established in place of the one-wheel mode in an instance where a sum of the braking forces which would be generated for the right wheel and the left wheel in the two-wheel mode in accordance with the operation of the brake operation member is larger than the braking force which is being generated for the one of the right wheel and the left wheel in the one-wheel mode.

When the automatic brake is being executed, the driver may sometimes perform the brake operation in an effort to obtain a larger braking force, for instance. This form is suitable for such an instance.

(4) The vehicle brake system according to any one of the forms (1) through (3), wherein the hydraulic brake device is provided for one of: front right and left wheels; and rear right and left wheels, and wherein the vehicle brake system further comprises an electric brake device provided for the other of: the front right and left wheels; and the rear right and left wheels, the electric brake device being configured to generate, based on the operation of the brake operation member, a braking force that depends on a force generated by an electric motor.

In general, the hydraulic brake device has the advantage of high reliability, and the electric brake device has the advantage of good response. According to this form, it is possible to construct the vehicle brake system that makes the best use of the advantages of the two brake devices of mutually different types. In an instance where the vehicle brake system further includes a regenerative brake device, a braking force generated by the regenerative brake device varies depending upon a vehicle running speed and a state of charge (SOC) of a battery as a power source. In an instance where the vehicle brake system is configured such that an overall braking force required for the vehicle is generated as a sum of the braking forces respectively generated by the hydraulic brake device, the electric brake device, and the regenerative brake device, for instance, this form enables the variation in the braking force of the regenerative brake device to be suitably dealt with by utilizing the good response of the electric brake device. That is, the variation in the braking force of the regenerative brake device can be dealt with by changing the braking force of the electric brake device, so that the vehicle brake system according to this form enables the braking force generated by the whole system to be appropriately stabilized.

(5) The vehicle brake system according to the form (4), wherein the hydraulic brake device is provided for the front right and left wheels, and the electric brake device is provided for the rear right and left wheels.

When focusing on a ratio between the braking force for the front wheels and the braking force for the rear wheels, the braking force for the front wheels is made larger in ordinary vehicles. According to this form, the hydraulic brake device having high reliability is employed for the front wheels that require a larger braking force, making it possible to construct the vehicle brake system excellent in reliability, in particular.

(6) The vehicle brake system according to the form (4) or (5), wherein a ratio between the braking force to be generated for the right wheel by the electric brake device and the braking force to be generated for the left wheel by the electric brake device is changed depending upon which one of the two-wheel mode and the one-wheel mode is being established.

In one of: the front wheels; and the rear wheels for which the hydraulic brake device is provided, the braking force is generated, in the one-wheel mode, for only one of the right wheel and the left wheel. In the other of: the front wheels; and the rear wheels for which the electric brake device is provided, if the braking force for the right wheel and the braking force for the left wheel are made equal to each other, a balance of the braking force between the right side and the left side of the vehicle as a whole deteriorates. This results in a yawing behavior of the vehicle even though the vehicle is travelling straightforward. Consequently, the ratio between the braking force to be generated for the right wheel by the electric brake device and the braking force to be generated for the left wheel by the electric brake device is preferably changed, for instance. For instance, a wheel for which the braking force should be generated by the failed system in the hydraulic brake device is referred to as a failed-system-side wheel. In this case, the braking force to be generated by the electric brake device for one of two wheels that is located diagonally with respect to the failed-system-side wheel is preferably made smaller than the other of the two wheels that is located on the same side as the failed-system-side wheel in the right-left direction. That is, it is preferable to decrease a difference in the braking force between the right side and the left side of the vehicle as a whole.

According to this form, the ratio between the braking force to be generated for the right wheel by the electric brake device and the braking force to be generated for the left wheel by the electric brake device can be made different between the two-wheel mode and the one-wheel mode. Thus, the ratio of the braking force to be generated between the right side and the left side of the vehicle as a whole in the two-wheel mode and the ratio of the braking force to be generated between the right side and the left side of the vehicle as a whole in the one-wheel mode can be made close to each other. As a result, the vehicle can travel straightforward with high stability in the one-wheel mode.

In an instance where the changing of the ratio of the braking force is employed in the above forms in which the operation mode of the hydraulic brake device is switched from the one-wheel mode to the two-wheel mode by the brake operation by the driver, the high response of the electric brake device is particularly effective.

(7) The vehicle brake system according to any one of the forms (1) through (6), wherein the hydraulic brake device includes a reservoir, as a low-pressure source, which stores the working fluid, wherein the master cylinder is configured to pressurize the working fluid stored in the reservoir, wherein the controlled-pressure supply device includes:
 a reservoir fluid passage connected to the reservoir not via the master cylinder;
 a pump device, as a high-pressure source, which is configured to pump up the working fluid stored in the reservoir via the reservoir fluid passage so as to pressurize the working fluid and to supply the pressurized working fluid to the wheel brakes;
 a pair of return fluid passages each of which connects a corresponding one of the wheel brakes to the reservoir or the reservoir fluid passage; and
 a pair of electromagnetic control valves which are provided respectively for the return fluid passages and each of which is configured to control a flow of the working fluid from a corresponding one of the wheel brakes to the reservoir in accordance with electric current supplied thereto.

In this form, a specific structure of the controlled-pressure supply device is defined. Here, a case is considered in which the braking force is generated in the non-failed system in the one-wheel mode. In the controlled-pressure supply device, in this case, when the master shut-off valve in the failed system is in a valve open state, the pressure of the working fluid ejected from the pump device acts through the master fluid passage for which the master shut-off valve is provided. Consequently, this form sufficiently enjoys a merit of constructing the hydraulic brake device such that the two-wheel mode is established when the driver performs the brake operation, namely, a merit of not giving the driver the discomfort with respect to the brake operation.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which.

DETAILED DESCRIPTION OF THE EMBODIMENT

Figure 1:
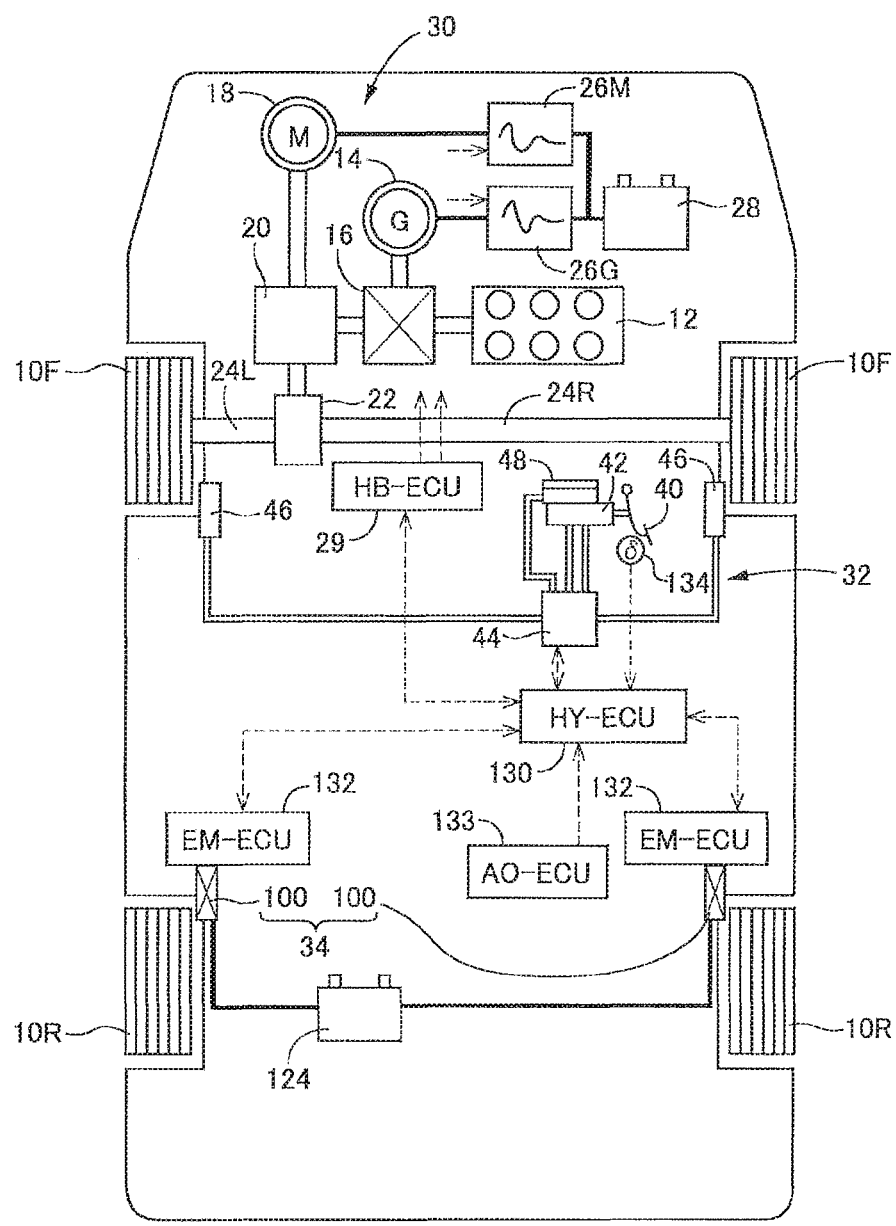
FIG. 1 is a view conceptually showing an overall structure of a vehicle brake system according to one embodiment.

Referring to the drawings, there will be explained below in detail one embodiment of the claimable invention. It is to be understood that the claimable invention is not limited to the details of the following embodiment but may be embodied based on the forms described in Forms of the Invention and may be changed and modified based on the knowledge of those skilled in the art.

[A] Outline of Vehicle Drive System and Vehicle Brake System

As schematically shown in FIG. 1, a vehicle on which a brake system according to one embodiment is installed is a hybrid vehicle having two front wheels 10F and two rear wheels 10R. The two front wheels 10F are drive wheels. A vehicle drive system is first explained. The vehicle drive system installed on the vehicle includes an engine 12 as a drive source, a generator 14 that functions mainly as an electric generator, a power-distribution mechanism 16 to which the engine 12 and the generator 14 are coupled, and an electric motor 18 as another drive source.

The power-distribution mechanism 16 has a function of distributing rotation of the engine 12 to rotation of the generator 14 and rotation of an output shaft. The electric motor 18 is coupled to the output shaft via a reduction mechanism 20 functioning as a speed reducer. Rotation of the output shaft is transmitted to the front right and left wheels 10F via a differential mechanism 22 and respective drive shafts 24L, 24R, so that the front right and left wheels 10F are drivingly rotated. The generator 14 is coupled to a battery 28 via an inverter 26G. Electric energy obtained by electric power generation of the generator 14 is stored in the battery 28. The electric motor 18 is coupled to the battery 28 via an inverter 26M. The electric motor 18 and the generator 14 are controlled by controlling the inverter 26M and the inverter 26G, respectively. Management of a charged amount of the battery 28 and control of the inverter 26M and the inverter 26G are executed by a hybrid electronic control unit (hereinafter abbreviated as "HB-ECU" as shown in FIG. 1) 29 that includes a computer and drive circuits (drivers) for components of the vehicle drive system.

As schematically shown in FIG. 1, the vehicle brake system according to the embodiment installed on the vehicle includes (a) a regenerative brake device 30 configured to give a braking force to each of the two front wheels 10F, (b) a hydraulic brake device 32 configured to give a braking force to each of the two front wheels 10F, independently of the braking force given by the regenerative brake device 30, and (c) an electric brake device 34 configured to give a braking force to each of the two rear wheels 10R.

[B] Structure of Regenerative Brake Device

In terms of hardware, the regenerative brake device 30 constitutes a part of the vehicle drive system. When the vehicle decelerates, the electric motor 18 is rotated by rotation of the front wheels 10F without receiving a power supply from the battery 28. The electric motor 18 generates electric power utilizing an electromotive force generated by its rotation, and the generated electric power is stored, via the inverter 26M, in the battery 28 as a quantity of electricity (which may be also referred to as an electric quantity or an electric charge). That is, the electric motor 18 functions as an electric generator, so that the battery 28 is charged. The rotation of the front wheels 10F is decelerated, namely, the vehicle is decelerated, by a degree corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the generated electric power, and the generated regenerative braking force is controlled by the control of the inverter 26M executed by the HB-ECU 29. A detailed explanation of the regenerative brake device 30 is dispensed with because any regenerative brake device having a known ordinary structure may be employed as the regenerative brake device 30.

[C] Structure of Hydraulic Brake Device i) Overall Structure

The hydraulic brake device 32 includes (a) a master cylinder 42 to which is connected a brake pedal 40, as a brake operation member, to be operated by a driver, (b) an actuator unit 44 configured to allow the working fluid from the master cylinder 42 to pass therethrough so as to supply the working fluid or configured to adjust the pressure of the working fluid pressurized by its pump (that will be explained) so as to supply the working fluid, and (c) a pair of wheel brakes 46 which are respectively provided for the front right and left wheels 10F and configured to decelerate rotation of the respective front right and left wheels 10F by the pressure of the working fluid supplied from the actuator unit 44. The hydraulic brake device 32 is a two-system device or tandem device corresponding to the front right and left wheels 10F.

ii) Structure of Master Cylinder

Figure 2:
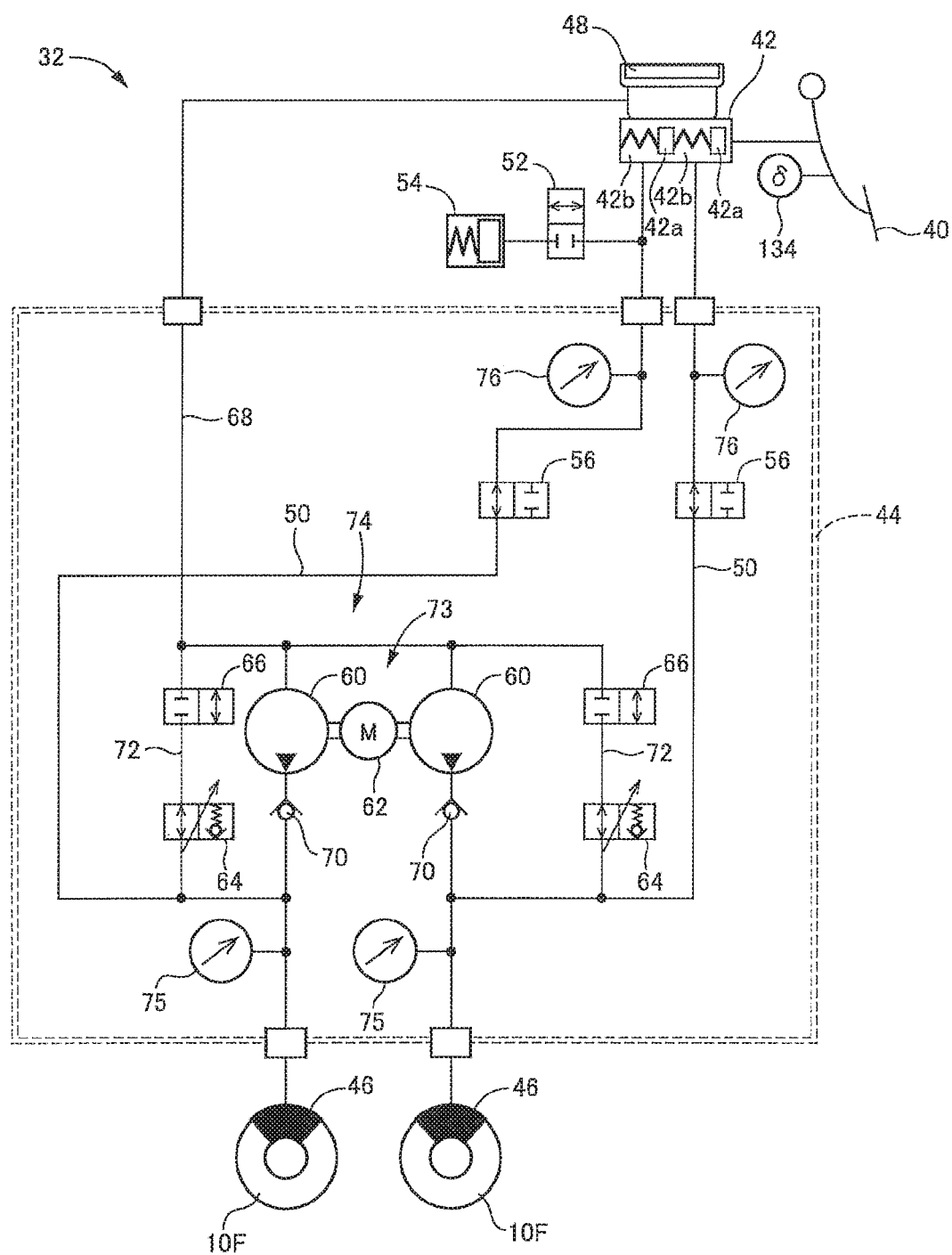
FIG. 2 is a hydraulic circuit diagram of a hydraulic brake device of the vehicle brake system shown in FIG. 1.

As shown in FIG. 2, the master cylinder 42 is a tandem cylinder device including, in a housing, two pistons 42a arranged in series and connected to the brake pedal 40, and two pressurizing chambers 42b in each of which the working fluid that has introduced thereinto is pressurized by a movement of a corresponding one of the pistons 42a. A reservoir 48, as a low-pressure source, is attached to the master cylinder 42. The reservoir 48 stores the working fluid at the atmospheric pressure. That is, the reservoir 48 is disposed near the master cylinder 42, and the working fluid from the reservoir 48 is pressurized in each of the two pressurizing chambers 42b. The master cylinder 42 is configured to supply, to the actuator unit 44, the working fluid whose pressure corresponds to a force applied to the brake pedal 40 (hereinafter referred to as "brake operation force" where appropriate), for the respective two systems that correspond to the respective two front wheels 10F. Specifically, the actuator unit 44 has fluid passages through which the working fluid supplied from the master cylinder 42 flows toward the respective wheel brakes 46. In other words, the hydraulic brake device 32 has a pair of master fluid passages 50 which are partly defined by the two fluid passages and through which the working fluid is supplied from the master cylinder 42 to the respective wheel brakes 46. That is, in the hydraulic brake device 32, the working fluid can be supplied from the master cylinder 42 to the wheel brakes 46 via the respective master fluid passages 50. Each of the wheel brakes 46 has a wheel cylinder (that will be explained), and the working fluid is supplied to the wheel cylinder.

To one of the two master fluid passages 50, a stroke simulator 54 is connected via a simulator opening valve 52 which is a normally-closed electromagnetic open/close valve. (The normally-closed electromagnetic open/close valve is a valve which is in a valve closed state when not energized.) In a normal condition (which may be also referred to as a normal operating condition) in which no electric failure is occurring, the simulator opening valve 52 is energized into a valve open state, so that the stroke simulator 54 works. As explained below, in the normal condition, a pair of master cut valves (master shut-off valves) 56, which are two electromagnetic open/close valves and which are provided in the actuator unit 44 so as to correspond to the respective two systems, are placed in the valve closed state, so that the stroke simulator 54 permits a depression stroke of the brake pedal 40 and gives, to the brake pedal 40, an operation reaction force in accordance with the depression stroke. That is, the stroke simulator 54 has a function of ensuring a feeling of the brake operation in the normal condition. The stroke simulator 54 in the present embodiment has a known structure. For instance, the stroke simulator 54 includes: a fluid chamber which communicates with one of the master fluid passages 50 and whose volume is variable; and an elastic body configured to apply, to the working fluid in the fluid chamber, a force in accordance with an increase amount of the volume in the fluid chamber. Thus, the stroke simulator 54 is not explained in detail here.

iii) Structure of Actuator Unit

The actuator unit 44 includes: the two master cut valves 56, each as a normally-opened electromagnetic open/close valve, configured to shut off flows of the working fluid through the respective two master fluid passages 50 (The normally-opened electromagnetic open/close valve is a valve which is in a valve open state when not energized.); a pair of pumps 60 which correspond to the respective two systems; a motor 62 for driving the pumps 60; a pair of pressure holdings valve 64, each as an electromagnetic linear valve (electromagnetic control valve), which correspond to the respective two systems; and a pair of opening valves 66, each as a normally-closed electromagnetic open/close valve, which are disposed in series with the respective pressure holding valves 64. In the hydraulic brake device 32, only one reservoir is provided, and the two pumps 60 are configured to pump up the working fluid from the reservoir 48. To this end, there is formed a reservoir fluid passage 68 that connects the two pumps 60 and the reservoir 48, and a part of the reservoir fluid passage 68 is located in the actuator unit 44. Each of the pumps 60 is connected to the corresponding master fluid passage 50 on its ejection side and supplies, to the corresponding wheel brake 46, the pressurized working fluid via a part of the master fluid passage 50. On the ejection side of each of the pumps 60, a check valve 70 is provided for preventing a backflow of the working fluid to the pump 60. A pair of return fluid passages 72 are formed in the actuator unit 44 so as to correspond to the two systems. Each of the return passages 72 is formed in parallel with the corresponding pump 60 so as to connect the corresponding master fluid passage 50 and the reservoir fluid passage 68. In each of the return fluid passages 72, the pressure holding valve 64 and the opening valve 66 are provided. Each opening valve 66 is a valve for opening the corresponding return fluid passage 72. Accordingly, the opening valve 66 will be referred to as "return passage opening valve 66" where appropriate. Conversely, the opening valve 66 is a valve that closes the return fluid passage 72 in its non-energized state. Accordingly, the opening valve 66 may be regarded as a shut-off valve. In the actuator unit 44, the two pumps 60 and the motor 62 constitute one pump device 73 functioning as a high-pressure source. Further, a controlled fluid pressure supply device 74 is constituted by the pump device 73, the reservoir fluid passage 68 connected to the reservoir 48 not via the master cylinder 42, the two return fluid passages 72, the two pressure holding valves 64, and the two return passage opening valves 66. The controlled fluid pressure supply device 74 is configured to supply, to the wheel brakes 46, the working fluid from the pump device 73 while controlling the pressure of the working fluid.

In the actuator unit 44, a pair of wheel cylinder pressure sensors 75 and a pair of master pressure sensors 76 are provided so as to correspond to the two systems. Each wheel cylinder pressure sensor 75 is configured to detect the pressure of the working fluid supplied to the corresponding wheel brake 46 (hereinafter referred to as "wheel cylinder pressure" where appropriate). Each master pressure sensor 76 is configured to detect the pressure of the working fluid supplied from the master cylinder 42 (hereinafter referred to as "master pressure" where appropriate).

iv) Structure of Wheel Brake

Figure 3A:
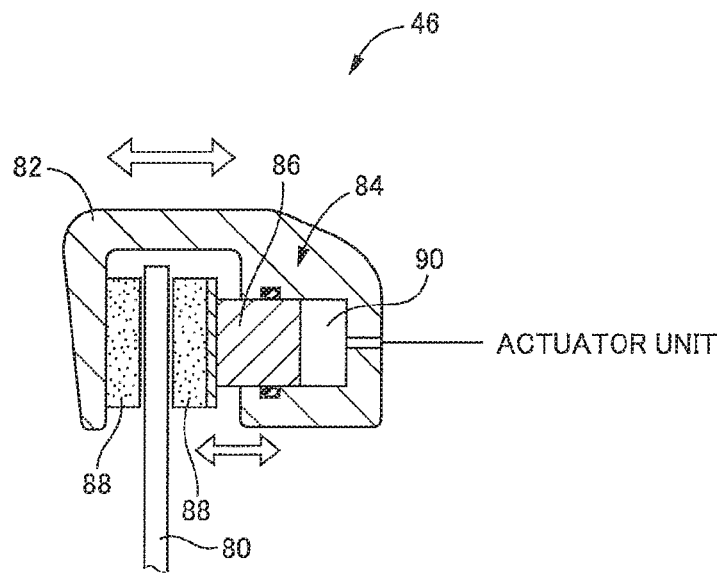
FIG. 3A is a cross-sectional view of a wheel brake of the hydraulic brake device of the vehicle brake system shown in FIG. 1.

Each wheel brake 46 for stopping rotation of the corresponding front wheel 10F is a disc brake device schematically shown in FIG. 3A. Each wheel brake 46 includes a disc rotor 80, as a rotation body, configured to rotate together with the corresponding front wheel 10F and a caliper 82 movably supported by a carrier that rotatably holds the front wheel 10F. The caliper 82 incorporates a wheel cylinder 84 whose housing is defined by a part of the caliper 82. A pair of brake pads 88, each as a friction member, is provided such that one brake pad 88 is attached to and held by a distal end of a piston 86 of the wheel cylinder 84 and the other brake pad 88 is attached to and held by a portion of the caliper 82 located opposite to a portion thereof in which the wheel cylinder 84 is incorporated. Thus, the two brake pads 88 are opposed to each other with the disc rotor 80 interposed therebetween.

The working fluid is supplied from the actuator unit 44 to a fluid chamber 90 of the wheel cylinder 84, and the pressure of the working fluid causes the brake pads 88 to nip the disc rotor 80 therebetween. That is, the wheel cylinder 84 is operated to cause the brake pads 88 to be pushed onto the disc rotor 80. Thus, each wheel brake 46 generates, utilizing a friction force, a braking force to stop rotation of the corresponding front wheel 10F, i.e., a braking force to brake the vehicle (hereinafter referred to as "hydraulic braking force" where appropriate). The hydraulic braking force has a magnitude in accordance with the pressure of the working fluid supplied from the actuator unit 44. The wheel brakes 46 have a known ordinary structure, and a detailed explanation thereof is dispensed with.

[D] Structure of Electric Brake Device

Figure 3B:
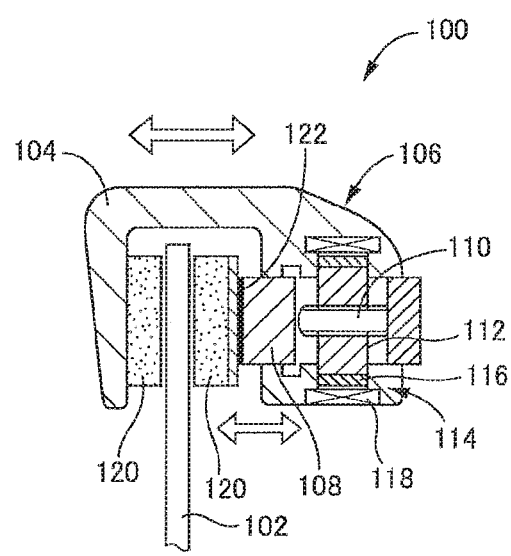
FIG. 3B is a cross-sectional view of a wheel brake of an electric brake device of the vehicle brake system shown in FIG. 1.

As shown in FIG. 1, the electric brake device 34 includes a pair of wheel brakes 100 for stopping rotation of the corresponding rear wheels 10R. As shown in FIG. 3B, each wheel brake 100 is similar in structure to the wheel brakes 46 of the hydraulic brake device 32. Each wheel brake 46 operates by the pressure of the working fluid whereas each wheel brake 100 operates by a force of an electric motor.

Each wheel brake 100 includes a disc rotor 102, as a rotation body, configured to rotate together with the corresponding rear wheel 10R and a caliper 104 movably supported by a carrier that rotatably holds the corresponding rear wheel 10R. The caliper 104 incorporates an electric actuator 106. The electric actuator 106 includes (a) a plunger 108 held by the caliper 104 so as to be advanceable and retractable, (b) a threaded rod 110 which is held by the caliper 104 so as to be unrotatable and so as to be advanceable and retractable and which has an external thread formed on its outer circumference, (c) a nut 112 which has an internal thread that is held in engagement with the external thread of the threaded rod 110 and which is held by the caliper 104 so as to be rotatable and so as not to be advanceable and retractable, and (d) an electric motor 114 configured to rotate the nut 112. The electric motor 114 includes: magnets 116 attached to an outer circumference of the nut 112; and coils 118 held by the caliper 104.

A pair of brake pads 120, each as a friction member, is provided such that one brake pad 120 is attached to and held by a distal end of the plunger 108 of the electric actuator 106 and the other brake pad 120 is attached to and held by a portion of the caliper 104 located opposite to a portion thereof in which the electric actuator 106 is disposed. Thus, the two brake pads 120 are opposed to each other with the disc rotor 102 interposed therebetween. The electric actuator 106 is configured such that the brake pads 120 are pushed onto the disc rotor 102 by rotation of the electric motor 114 as a drive source. In other words, the electric actuator 106 includes a mechanism constituted by the plunger 108, the threaded rod 110, and the nut 112, namely, a motion converting mechanism for moving the friction members by a force of the electric motor 114. That is, each wheel brake 100 of the electric brake device 34 controls a force to be generated by the electric motor 114 in accordance with electric current supplied to the electric motor 114 and applies the force as a force for stopping or decelerating the rotation of the wheel, via the motion converting mechanism.

Thus, each wheel brake 100 of the electric brake device 34 generates, utilizing a friction force, a braking force to stop rotation of the corresponding rear wheel 10R, namely, a braking force to brake the vehicle (hereinafter referred to as "electric braking force" where appropriate). The electric braking force depends on a pushing force by which the brake pad 120 is pushed by the plunger 108. Each wheel brake 100 has a pushing force sensor 122, as a load cell, provided between the plunger 108 and the brake pad 120 for detecting the pushing force. The wheel brakes 100 have a known ordinary structure, and a detailed explanation thereof is dispensed with. As shown in FIG. 1, electric current is supplied to the electric motor 114 of each wheel brake 100 from an auxiliary battery 124 different from the battery 28.

Figure 4A:
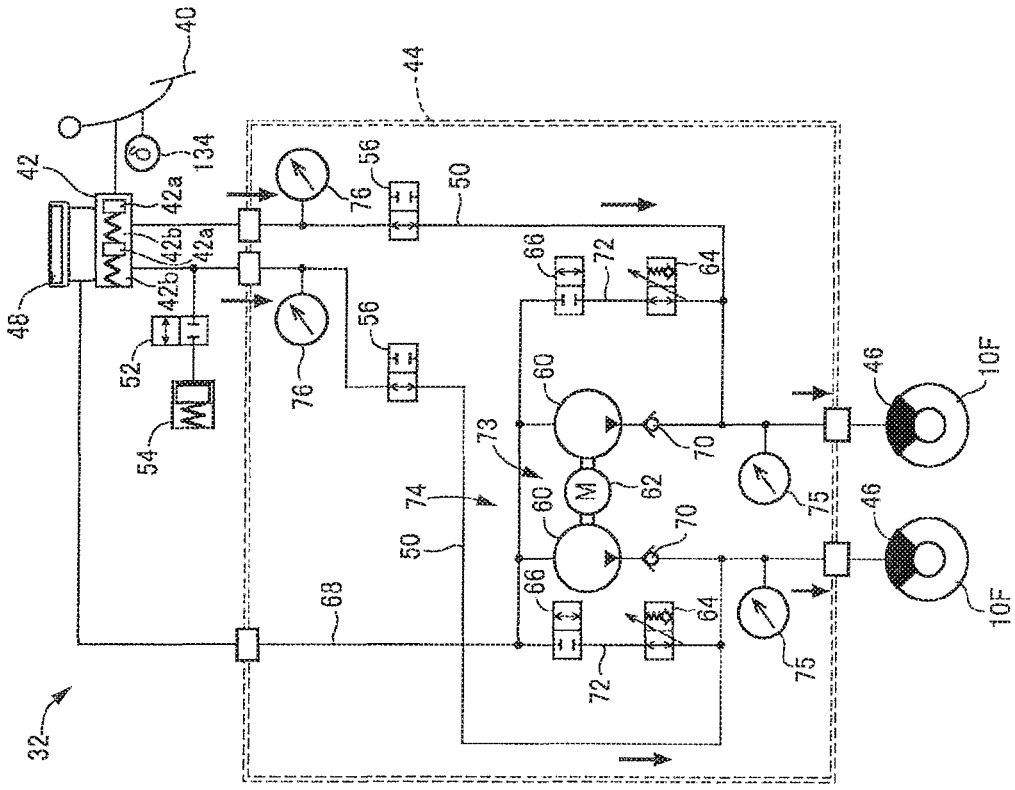
FIG. 4A is a view showing flows of a working fluid in a normal condition of the hydraulic brake device.

[E] Operation of Hydraulic Brake Device in Normal Condition and Measures for Coping with Failure i) Operation in Normal Condition In the normal condition, namely, when the hydraulic brake device 32 is not suffering from any failure, the master cut valves 56 are placed in the valve closed state, and the return passage opening valves 66 are placed in the valve open state, as shown in FIG. 4A. When the pumps 60 are driven by the motor 62, the working fluid in the reservoir 48 is pressurized so as to be supplied to the wheel brakes 46. Each of the pressure holding valves 64 has a function of adjusting the pressure of the working fluid to be supplied to a corresponding one of the wheel brakes 46 to a pressure in accordance with electric current supplied thereto. In other words, each pressure holding valve 64 is a pressure-decrease electromagnetic linear valve having a function of decreasing the pressure of the working fluid to be supplied to the corresponding wheel brake 46. An electronic control unit 130 for the hydraulic brake device (hereinafter abbreviated as "HY-ECU 130") controls electric current supplied to the pressure holding valves 64 based on a required hydraulic braking force $F_{HY}$ (which will be explained), whereby each wheel brake 46 generates the braking force in accordance with the required hydraulic braking force $F_{HY}$. That is, in the normal condition, there is supplied, to the wheel brakes 46, the working fluid whose pressure is adjusted by controlling the pressure holding valves 64, without depending on the pressure of the working fluid supplied from the master cylinder 42, namely, without depending on the brake operation force applied to the brake pedal 40. Because each of the pressure holding valves 64 is a pressure-decrease valve, the working fluid passes through each pressure holding valve 64 for pressure adjustment. The working fluid that has passed through the pressure holding valves 64 is returned to the reservoir fluid passage 68 and accordingly to the reservoir 48 via the respective return fluid passages 72 and the respective return passage opening valves 66 which are placed in the valve open state. In the normal condition, the simulator opening valve 52 is also placed in the valve open state.

ii) Measures for Coping with Failure

Figure 4B:
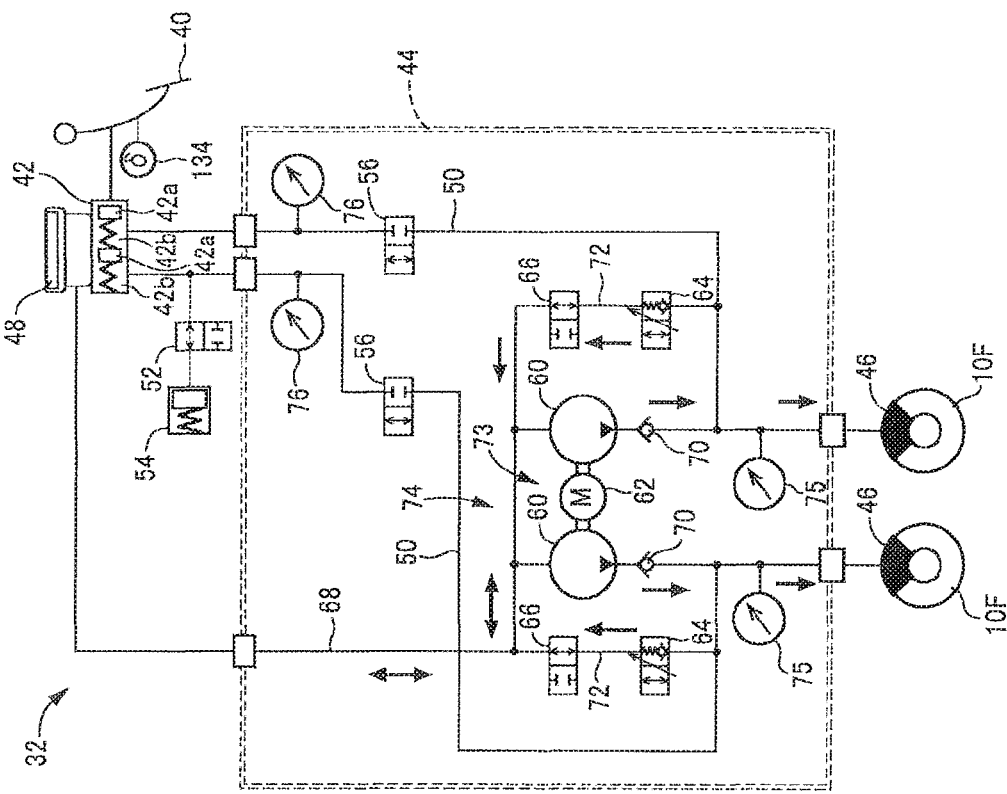
FIG. 4B is a view showing flows of the working fluid when both of two systems of the hydraulic brake device are in failure.

A case is considered in which both of the two systems of the hydraulic brake device 32 are in failure, specifically, a case in which power supply function is disabled, namely, no electric power can be supplied to the actuator unit 44. In this case, as shown in FIG. 4B (indicating a state of the hydraulic brake device 32 which is the same as the state shown in FIG. 2), the master cut valves 56 are placed in the valve open state, and the return passage opening valves 66 are placed in the valve closed state, and the working fluid supplied from the master cylinder 42 to the actuator unit 44 is supplied to the wheel brakes 46. Specifically, the return passage opening valves 66 shut off flows of the working fluid into the reservoir 48 or the reservoir fluid passage 68 while the master cut valves 56 are opened, so that the wheel cylinders 84 of the respective wheel brakes 46 are operated by the working fluid supplied from the master cylinder 42. In this respect, each of the pressure holding valves 64 is placed in the valve open state when not energized.

Next, a case is considered in which only one of the two systems of the hydraulic brake device 32 is in failure, specifically, a case in which no electric power can be supplied to any of the master cut valve 56, the pressure holding valve 64, and the return passage opening valve 66 in one of the two systems. In this case, the hydraulic brake device 32 operates basically in the same way as when both of the two systems are in failure. That is, the hydraulic brake device 32 operates in a two-wheel mode in which the master cut valves 56 allow flows of the working fluid through the respective master fluid passages 50, and the braking force that depends on the pressure of the working fluid supplied from the master cylinder 42 is generated for each of the right and left wheels.

Figure 5:
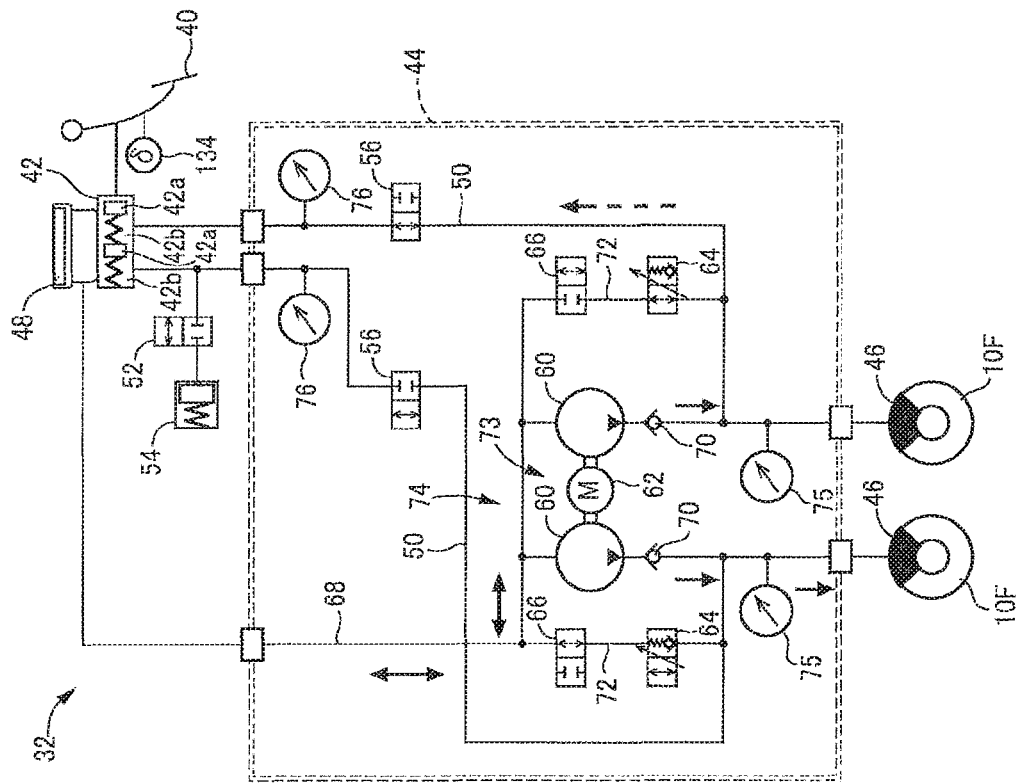
FIG. 5 is a view showing flows of the working fluid when the hydraulic brake device operates in the one-wheel mode in a state in which one of the two systems is in failure.

When the request for the automatic brake explained above is made, however, the hydraulic brake device 32 operates in a one-wheel mode. In the one-wheel mode shown in FIG. 5 (indicating a state in which the right-side system in FIG. 5 is in failure), one of the master cut valves 56 that corresponds to the non-failed system shuts off the flow of the working fluid through one of the master fluid passages 50 that corresponds to the non-failed system, and the braking force that depends on the working fluid supplied by the controlled-pressure supply device 74 is generated for only one of the right and left wheels that corresponds to the non-failed system. Specifically, the master cut valve 56 and the return passage opening valve 66 of the non-failed system are energized, and the supply of electric power to the pressure holding valve 64 of the non-failed system is controlled. According to the operation in the one-wheel mode, when the automatic brake which is not based on the operation of the brake pedal 40 by the driver is executed, the hydraulic braking force $F_{HY}$ by the hydraulic brake device 32 is generated for one of the right and left front wheels 10F. In other words, when one of the two systems is in failure, the hydraulic brake device operates in the one-wheel mode, so that it is possible to obviate a situation in which the hydraulic braking force $F_{HY}$ is not generated at all when the automatic brake is executed.

In the one-wheel mode, the master cut valve 56 of the failed system is in the valve open state, and the pump 60 of the non-failed system is driven, so that the pressure of the working fluid pressurized by the pump 60 acts on the master cylinder 42, as indicated by the dashed-line arrow in FIG. 5. The action of the pressure of the working fluid gives the driver discomfort with respect to the brake operation if the driver operates the brake pedal 40. In view of this, the hydraulic brake device 32 is configured such that one of the two-wheel mode and the one-wheel mode is selectively established and such that the one-wheel mode is established in principle when the automatic brake which is not based on the brake operation is executed. If it is possible to place the master cut valve 56 of the failed system in the valve closed state, this master cut valve 56 may be placed in the valve closed state in the one-wheel mode so as not to give the driver the discomfort.

There is a possibility that the driver operates the brake pedal 40 in an attempt to generate a larger braking force even when the automatic brake is being executed. In such a case, a comparison is made between: the hydraulic braking force $F_{HY}$ which is being generated in the one-wheel mode, namely, the hydraulic braking force $F_{HY}$ which is being generated in one of the front right and left wheels 10F corresponding to the non-failed system; and a sum of the hydraulic braking forces $F_{HY}$ which would be generated for the front right and left wheels 10F if the two-wheel mode were established. The operation mode of the hydraulic brake device 32 is switched from the one-wheel mode to the two-wheel mode on condition that the sum of the hydraulic braking forces $F_{HY}$ which would be generated in the two-wheel mode is larger than the hydraulic braking force $F_{HY}$ which is being generated in the one-wheel mode.

[F] Control of Vehicle Brake System i) Control System

Control of the vehicle brake system, namely, control of a braking force F, is executed by a control system shown in FIG. 1. (Hereinafter, respective braking forces are collectively referred to as "braking force F" where appropriate.) Specifically, the hydraulic brake device 32 is controlled by the electronic control unit for the hydraulic brake device, i.e., the HY-ECU 130. The electric brake device 34 is controlled by two electronic control units for the electric brake device (hereinafter each abbreviated as "EM-ECU" where appropriate) 132 provided for the respective wheel brakes 100. The HY-ECU 130 includes a computer and drivers (drive circuits) for components of the hydraulic brake device 32. Each of the EM-ECUs 132 includes a computer and drivers (drive circuits) for components of the electric brake device 34. As explained above, the regenerative brake device 30 is controlled by the HB-ECU 29.

More specifically, the HB-ECU 29 controls the inverters 26G, 26M that constitute the regenerative brake device 30. The HY-ECU 130 controls the master cut valves 56, the pressure holding valves 64, the return passage opening valves 66, and the motor 62 of the pump device 73 included in the actuator unit 44 that constitutes the hydraulic brake device 32. The EM-ECUs 132 control the electric motors 114 of the wheel brakes 100 that constitute the electric brake device 34. Thus, the regenerative braking force $F_{RG}$, the hydraulic braking force $F_{HY}$, and the electric braking force $F_{EM}$ are controlled. Consequently, an overall braking force $F_{SUM}$, which is the braking force F to be given to the vehicle as a whole, is controlled. In the vehicle brake system, the HB-ECU 29, the HY-ECU 130, and the EM-ECUs 132 are connected to one another by a network in the vehicle (CAN) and execute the respective controls while performing communication with one another. As later explained, the HY-ECU 130 functions, in the vehicle brake system, as a main electronic control unit that also controls the HB-ECU 29 and the EM-ECUs 132.

The vehicle on which the present vehicle brake system is installed is capable of executing automatic or autonomous driving following the preceding vehicle or capable of avoiding collision of the own vehicle. That is, automatic driving of the vehicle is executable, and there is installed, on the vehicle, an electronic control unit for vehicle automatic operation (hereinafter referred to as "AO-ECU" where appropriate) 133 which controls the automatic operation of the vehicle. In the automatic operation, a brake request which is not based on an intention of the driver, namely, a request for the automatic brake, is made when the distance between the own vehicle and the preceding vehicle is shortened or when the possibility of collision with an obstacle becomes high. The request is transmitted from the AO-ECU 133 to the HY-ECU 130 as a signal as to the overall braking force $F_{SUM}$ to be required (which will be explained). It may be considered that a controller of the vehicle brake system is constituted by the HB-ECU 29, the HY-ECU 130, the EM-ECUs 132, and the AO-ECU 133.

ii) Basic Control of Braking Force

Basic control of the braking force in the present vehicle brake system, namely, control in the normal condition, is executed in the following manner. A required overall braking force $F_{SUM}^*$, which is a braking force F required for the vehicle as a whole (i.e., a sum of the braking forces F to be given to the four wheels 10), is determined based on an operation of the brake pedal 40. Specifically, the brake pedal 40 is provided with an operation stroke sensor 134 for detecting an operation stroke δ which is the operation amount of the brake pedal 40, as shown in FIGS. 1 and 2. The HY-ECU 130 obtains the required overall braking force $F_{SUM}*$ by multiplying the operation stroke δ detected by the operation stroke sensor 134 by a braking force coefficient $α_F$. The operation stroke δ is one example of an operation value indicative of a degree of the operation of the brake pedal 40, namely, indicative of a degree of the brake operation. The operation stroke δ may be considered as a parameter indicative of the required overall braking force $F_{SUM}*$.

In an instance where the automatic brake is necessary, the AO-ECU 133 determines the required overall braking force $F_{SUM}*$, and information as to the required overall braking force $F_{SUM}*$ determined by the AO-ECU 133 is sent from the AO-ECU 133 to the HY-ECU 130. In this instance, the HY-ECU 130 executes the processing described below based on the required overall braking force $F_{SUM}*$ based on the information.

In the present vehicle brake system, the regenerative braking force $F_{RG}$ is preferentially generated, and the hydraulic braking force $F_{HY}$ and the electric braking force $F_{EM}$ cover a shortage in the required overall braking force $F_{SUM}*$ that cannot be covered by the regenerative braking force $F_{RG}$. The shortage will be hereinafter referred to as an insufficient braking force $F_{IS}$. Each of the regenerative braking force $F_{RG}$, the hydraulic braking force $F_{HY}$, and the electric braking force $F_{EM}$ corresponds to a sum of the braking forces F to be given to the two wheels 10, i.e., two front wheels 10F or two rear wheels 10R, by a corresponding one of the regenerative brake device 30, the hydraulic brake device 32, and the electric brake device 34. Actually, there are given, to each of the two front wheels 10F or each of the two rear wheels 10R, a half of the regenerative braking force $F_{RG}$, a half of the hydraulic braking force $F_{HY}$, and a half of the electric braking force $F_{EM}$, in the normal condition.

A signal as to the required overall braking force $F_{SUM}*$ is sent from the HY-ECU 130 to the HB-ECU 29, and the HB-ECU 29 determines a target regenerative braking force $F_{RG}*$ as a maximum regenerative braking force $F_{RG}$ that can be generated within a range not beyond the required overall braking force $F_{SUM}*$. A signal as to the target regenerative braking force $F_{RG}*$ is returned to the HY-ECU 130 from the HB-ECU 29.

Subsequently, the HY-ECU 130 determines the insufficient braking force $F_{IS}$ by subtracting the target regenerative braking force $F_{RG}*$ from the required overall braking force $F_{SUM}*$. To cover the insufficient braking force $F_{IS}$ by the hydraulic braking force $F_{HY}$ and the electric braking force $F_{EM}$, specifically, to cover the insufficient braking force $F_{IS}$ such that a ratio between the hydraulic braking force $F_{HY}$ and the electric braking force $F_{EM}$ becomes equal to a set distribution ratio ($β_{HY}:β_{EM}$), the HY-ECU 130 multiplies the insufficient braking force $F_{IS}$ by a hydraulic braking force distribution coefficient $β_{HY}$ and an electric braking force distribution coefficient $β_{EM}$ ($β_{HY}+β_{EM}=1$), respectively, so as to determine a target hydraulic braking force $F_{HY}*$ as the hydraulic braking force $F_{HY}$ to be generated and a target electric braking force $F_{EM}*$ as the electric braking force $F_{EM}$ to be generated. A signal as to the target electric braking force $F_{EM}*$ is sent from the HY-ECU 130 to the EM-ECUs 132.

The regenerative brake device 30, the hydraulic brake device 32, and the electric brake device 34 are controlled based on the target regenerative braking force $F_{RG}*$, the target hydraulic braking force $F_{HY}*$, and the target electric braking force $F_{EM}*$, respectively. Specifically, the HB-ECU 29 controls the inverter 26M such that the regenerative braking force $F_{RG}$ becomes equal to the target regenerative braking force $F_{RG}*$. The HY-ECU 130 controls the electric currents supplied to the motor 62 and the pressure holding valves 64 such that the hydraulic braking force $F_{HY}$ becomes equal to the target hydraulic braking force $F_{HY}*$. The EM-ECUs 132 control the electric current supplied to the electric motors 114 such that the electric braking force $F_{EM}$ becomes equal to the target electric braking force $F_{EM}*$.

According to the basic control described above, the regenerative braking force, the hydraulic braking force, and the electric braking force are controlled so as to cooperate with one another. Specifically, the regenerative braking force, the hydraulic braking force, and the electric braking force are cooperatively controlled such that the hydraulic braking force and the electric braking force cover the shortage in the required overall braking force that cannot be covered by the regenerative braking force, i.e., the insufficient braking force. The cooperative control enables an appropriate required overall braking force to be easily obtained even if the regenerative braking force varies due to a variation in the vehicle running speed or a variation in the state of charge (SOC) of the battery 28. Further, the hydraulic braking force and the electric braking force are cooperatively controlled such that the hydraulic braking force and the electric braking force are generated at the set distribution ratio ($β_{HY}:β_{EM}$). The cooperative control enables the two braking forces to be controlled according to a simple control rule, whereby an appropriate braking force required for the vehicle as a whole can be easily controlled.

iii) Control of Braking Force when Hydraulic Brake Device is in Failure

In an instance where the hydraulic brake device 32 is in failure, the hydraulic brake device 32 operates basically in the two-wheel mode. In the two-wheel mode, the hydraulic braking force $F_{HY}$ for the front wheels 10F mainly corresponds to the hydraulic braking force $F_{HY}$ that depends on the operation force applied to the brake pedal 40 by the driver, and the hydraulic braking force $F_{HY}$ by the controlled-pressure supply device 74 is not generated. Thus, the target hydraulic braking force $F_{HY}*$ is equal to 0.

When the brake request for the automatic brake is made from the AO-ECU 133 in a state in which one of the two systems is in failure, the operation mode is changed from the two-wheel mode to the one-wheel mode. In this instance, the hydraulic braking force $F_{HY}$ by the controlled-pressure supply device 74 is generated only for the front wheel 10F corresponding to the non-failed system (hereinafter referred to as "non-failed wheel 10Fs" where appropriate). Consequently, the target hydraulic braking force $F_{HY}*$ (10Fd) for the front wheel 10F corresponding to the failed system (hereinafter referred to as "failed wheel 10Fd" where appropriate) is made equal to 0, and the target hydraulic braking force $F_{HY}*$ for the non-failed wheel 10Fs is increased so as to increase the hydraulic braking force $F_{HY}$ generated by the wheel brake 46 of the non-failed wheel 10Fs in consideration of a shortage of the overall braking force $F_{SUM}$. Specifically, the target hydraulic braking force $F_{HY}*$(10Fs) for the non-failed wheel 10Fs is doubled in the present vehicle brake system.

In the one-wheel mode, the ratio between the electric braking force $F_{EM}$ generated for the rear right wheel 10R by the electric brake device 34 and the electric braking force $F_{EM}$ generated for the rear left wheel 10R by the electric brake device 34 is changed, namely, a distribution ratio of the electric braking force $F_{EM}$ between the rear right wheel 10R and the rear left wheel 10R is changed. Specifically, in the normal condition and the two-wheel mode, the distribution ratio of the electric braking force $F_{EM}$ between the rear right and left wheels 10R, in other words, the distribution ratio of the target electric braking force $F_{EM}*$, is 1:1. In the one-wheel mode, the distribution ratio between: the rear wheel 10R which is located on the same side as the failed wheel 10Fd in the right and left direction (hereinafter referred to as "failed-side rear wheel 10Rd" where appropriate); and the rear wheel 10R which is located on the opposite side of the failed wheel 10Fd in the right and left direction (hereinafter referred to as "non-failed-side rear wheel 10Rs" where appropriate) is changed to 1.5:0.5. The change in the distribution ratio mitigates an imbalance of the braking force F between the right side and the left side of the vehicle in the one-wheel mode, making it possible to obviate a deterioration in the straightforward traveling capability of the vehicle. The changed distribution ratio is not limited to 1.5:0.5 but may be suitably set as long as the electric braking force $F_{EM}$ for the failed-side rear wheel 10Rd is larger than the electric braking force $F_{EM}$ for the non-failed-side rear wheel 10Rs.

As explained above, the switching of the operation mode from the one-wheel mode to the two-wheel mode, namely, the switching of the operation mode upon depression of the brake pedal 40 by the driver in the midst of execution of the automatic brake, is conducted by comparing: the hydraulic braking force $F_{HY}$ which is actually being generated for the non-failed wheel 10Fs in the one-wheel mode; and the hydraulic braking force $F_{HY}$ which would be generated for both of the front wheels 10F in the two-wheel mode (hereinafter referred to as "estimated two-wheel-mode braking force $F_{HY}'$" where appropriate). The hydraulic braking force $F_{HY}$ which is actually being generated is determined based on the pressure of the working fluid of the wheel cylinder 84 detected by the wheel cylinder pressure sensor 75 corresponding to the non-failed wheel 10Fs, and the estimated two-wheel-mode braking force $F_{HY}'$ is obtained based on the operation stroke δ of the brake pedal 40 detected by the operation stroke sensor 134. When the estimated two-wheel-mode braking force $F_{HY}'$ is larger than the hydraulic braking force $F_{HY}$ which is actually being generated in the one-wheel mode, the operation mode is switched to the two-wheel mode. According to the switching of the operation mode to the two-wheel mode, the distribution ratio of the electric braking force $F_{EM}$ between the rear right wheel 10R and the rear left wheel 10F is changed back to 1:1. The change of the distribution ratio causes the electric braking forces $F_{EM}$ for the respective rear right and left wheels 10R to be instantaneously changed. In this respect, the electric braking forces $F_{EM}$ can be changed appropriately owing to a good response of the electric brake device 34.

iv) Control Flow

Figure 6:
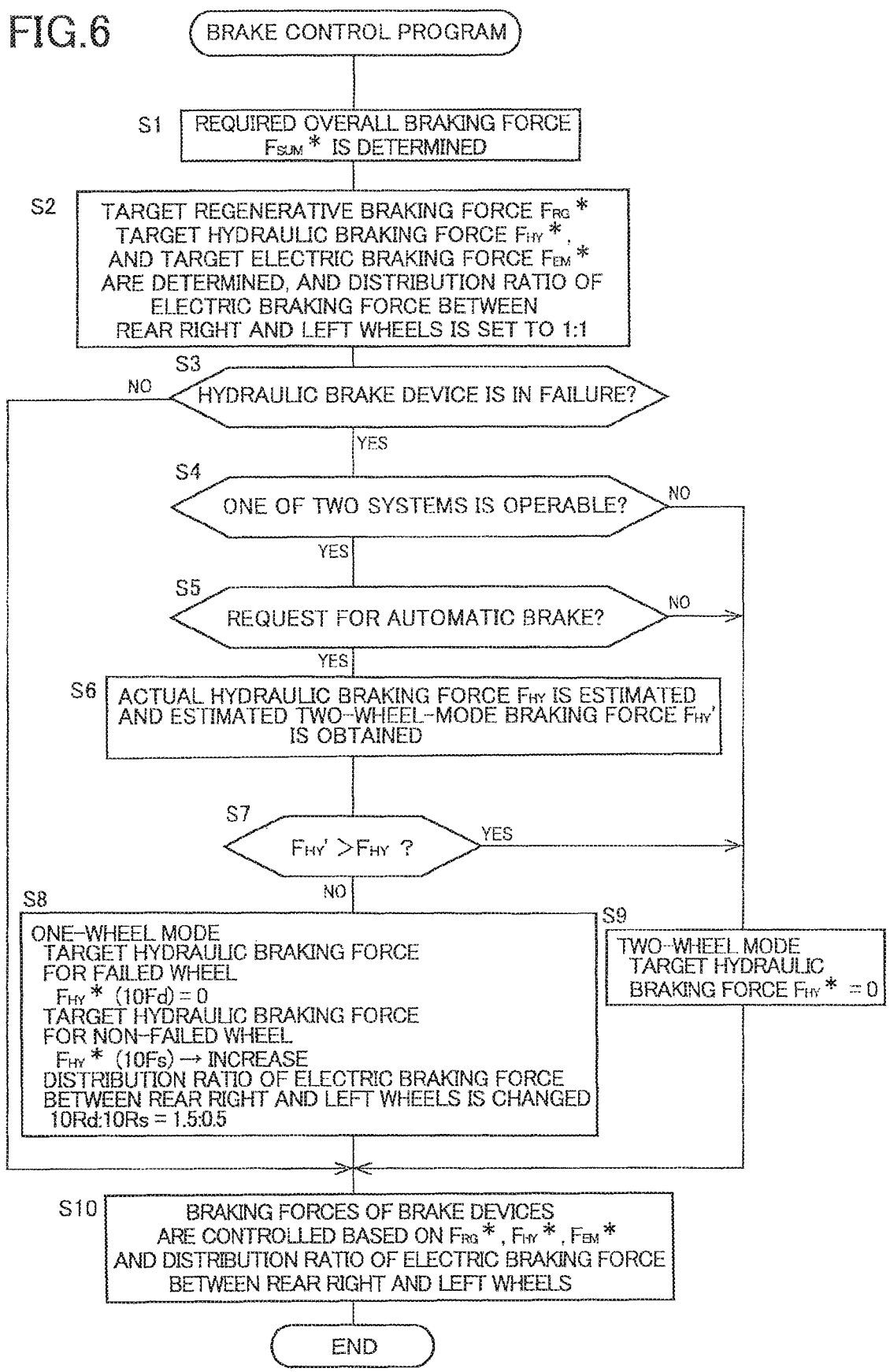
FIG. 6 is a flowchart showing a brake control program executed in the vehicle brake system.

The HY-ECU 130 is a principal device of the controller of the vehicle brake system. The measures for coping with the failure of the hydraulic brake device 32 and the control of the braking force F including the measures are effectuated such that the HY-ECU 130 repeatedly executes a brake control program shown by a flowchart of FIG. 6 at a short time pitch from several milliseconds to several tens of milliseconds, for instance. A flow of the process executed by the brake control program, i.e., a control flow, will be briefly explained.

In the process according to the brake control program, the required overall braking force $F_{SUM}*$ is initially determined at step 1. (Hereinafter, step 1 is abbreviated as "S1". Other steps are similarly abbreviated.) The determination at S1 is made based on the operation stroke δ of the brake pedal 40 in an instance where the braking force F is to be generated by the brake operation of the driver. Alternatively, the determination at S1 is made based on the information sent from the AO-ECU 133 in an instance where the braking force F is to be generated by the automatic brake. At S2, based on the required overall braking force $F_{SUM}*$ determined at S1, the target regenerative braking force $F_{RG}*$, the target hydraulic braking force $F_{HY}*$, and the target electric braking force $F_{EM}*$ are determined as described above, and the distribution ratio of the electric braking force $F_{EM}$ between the rear right wheel and the rear left wheel is set to 1:1.

At S3, it is determined whether the hydraulic brake device 32 is in failure. When it is determined that the hydraulic brake device 32 is not in failure, namely, when it is determined that the hydraulic brake device 32 is in the normal condition, the control flow goes to S10 at which the regenerative brake device 30, the hydraulic brake device 32, and the electric brake device 34 are controlled based on the target regenerative braking force $F_{RG}*$, the target hydraulic braking force $F_{HY}*$, the target electric braking force $F_{EM}*$, and the distribution ratio of the electric braking force $F_{EM}$ between the rear right wheel and the rear left wheel.

When it is determined at S3 that the hydraulic brake device 32 is in failure, the control flow goes to S4 at which it is determined whether one of the two systems of the hydraulic brake device 32 is normally operable. When both of the two systems cannot normally operate, the process for the two-wheel mode is executed at S9. In the process, the master cut valves 56 of both of the two systems are placed in the valve open state and the target hydraulic braking force $F_{HY}*$ is made equal to 0, so that the controlled-pressure supply device 74 does not substantially operate.

When it is determined at S4 that one of the two systems of the hydraulic brake device 32 is normally operable, S5 is implemented to determine whether there is a request for the automatic brake. In an instance where there is no request for the automatic brake, the process for the two-wheel mode is executed at S9. In an instance where the request for the automatic brake is made, S6 is implemented to estimate: the hydraulic braking force $F_{HY}$ which is actually being generated, specifically, the hydraulic braking force $F_{HY}$ which is actually being generated for the non-failed wheel 10Fs (hereinafter referred to as "actual hydraulic braking force $F_{HY}$" where appropriate); and the estimated two-wheel-mode braking force $F_{HY}'$ described above, in consideration of a possibility that the driver operates the brake pedal 40 in an attempt to obtain a larger braking force F. At S7, it is determined whether the estimated two-wheel-mode braking force $F_{HY}'$ is larger than the actual hydraulic braking force $F_{HY}$. When the estimated two-wheel-mode braking force $F_{HY}'$ is larger than the actual hydraulic braking force $F_{HY}$, the process for the two-wheel mode is executed at S9. In other words, the process for the one-wheel mode (which will be explained) is not executed.

When it is determined at S7 that the estimated two-wheel-mode braking force $F_{HY}'$ is not larger than the actual hydraulic braking force $F_{HY}$, the process for the one-wheel mode is executed at S8. In the process at S8, the target hydraulic braking force $F_{HY}*$ for the failed wheel 10Fd is made equal to 0, and the target hydraulic braking force $F_{HY}*$ for the non-failed wheel 10Fs is increased. Further, the ratio of the target electric braking force $F_{EM}*$ between the rear right wheel 10R and the rear left wheel 10R is changed so as to change the distribution of the electric braking force $F_{EM}$ between the rear right wheel and the rear left wheel. Specifically, the ratio of the target electric braking force $F_{EM}*$ is changed such that the electric braking force $F_{EM}$ for the failed-side rear wheel 10Rd is larger than the electric braking force $F_{EM}$ for the non-failed-side rear wheel 10Rs.

In any of the one-wheel mode and the two-wheel mode, the regenerative brake device 30, the hydraulic brake device 32, and the electric brake device 34 are controlled at S10 based on the target regenerative braking force $F_{RG}*$, the target hydraulic braking force $F_{HY}*$, and the target electric braking force $F_{EM}*$ determined in the process for each of the two modes and the distribution ratio of the electric braking force $F_{EM}$ between the rear right wheel and the rear left wheel changed in the process for each of the two modes. Thus, one execution of the brake control program is ended by termination of the process.

What is claimed is:

1. A brake system for a vehicle installed on the vehicle, the brake system comprising a brake operation member to be operated by a driver and a hydraulic brake device configured to generate a braking force that depends on a pressure of a working fluid in accordance with an operation of the brake operation member, wherein the hydraulic brake device includes two systems respectively corresponding to a right wheel and a left wheel, wherein the hydraulic brake device includes:
 a pair of wheel brakes which are provided respectively for the right wheel and the left wheel and which are configured to generate the braking force in accordance with a pressure of the working fluid supplied thereto;
 a master cylinder configured to pressurize the working fluid by a force applied to the brake operation member by the driver;
 a pair of master fluid passages through which the working fluid pressurized by the master cylinder is supplied to the respective wheel brakes;
 a pair of master shut-off valves which are provided respectively for the master fluid passages so as to shut off flows of the working fluid through the respective master fluid passages; and
 a controlled-pressure supply device including a high-pressure source and configured to supply, to the wheel brakes, the working fluid from the high-pressure source while controlling the pressure of the working fluid, wherein, in a normal condition, the master shut-off valves shut off the flows of the working fluid through the respective master fluid passages and the hydraulic brake device generates, for each of the right wheel and the left wheel, the braking force that depends on the working fluid supplied by the controlled-pressure supply device, and wherein, in a failure condition of one of the two systems, one of the following two operation modes of the hydraulic brake device is selectively established: (a) a two-wheel mode in which the master shut-off valves allow the flows of the working fluid through the respective master fluid passages and the hydraulic brake device generates, for each of the right wheel and the left wheel, the braking force that depends on a pressure of the working fluid supplied from the master cylinder; and (b) a one-wheel mode in which one of the master shut-off valves that corresponds to the other of the two systems shuts off the flow of the working fluid through a corresponding one of the master fluid passages and the hydraulic brake device generates the braking force that depends on the working fluid supplied by the controlled-pressure supply device for only one of the right wheel and the left wheel that corresponds to the other of the two systems.

2. The vehicle brake system according to claim 1, wherein, in the failure condition of the one of the two systems, the two-wheel mode is established when the driver operates the brake operation member while the one-wheel mode is established when a brake request not based on an intension of the driver is made.

3. The vehicle brake system according to claim 2, wherein, when the driver operates the brake operation member in a state in which the one-wheel mode is established, the two-wheel mode is established in place of the one-wheel mode in an instance where a sum of the braking forces which would be generated for the right wheel and the left wheel in the two-wheel mode in accordance with the operation of the brake operation member is larger than the braking force which is being generated for the one of the right wheel and the left wheel in the one-wheel mode.

4. The vehicle brake system according to claim 1, wherein the hydraulic brake device is provided for one of: front right and left wheels; and rear right and left wheels, and wherein the vehicle brake system further comprises an electric brake device provided for the other of: the front right and left wheels; and the rear right and left wheels, the electric brake device being configured to generate, based on the operation of the brake operation member, a braking force that depends on a force generated by an electric motor.

5. The vehicle brake system according to claim 4, wherein the hydraulic brake device is provided for the front right and left wheels, and the electric brake device is provided for the rear right and left wheels.

6. The vehicle brake system according to claim 4, wherein a ratio between the braking force to be generated for the right wheel by the electric brake device and the braking force to be generated for the left wheel by the electric brake device is changed depending upon which one of the two-wheel mode and the one-wheel mode is being established.

7. The vehicle brake system according to claim 1, wherein the hydraulic brake device includes a reservoir, as a low-pressure source, which stores the working fluid, wherein the master cylinder is configured to pressurize the working fluid stored in the reservoir, wherein the controlled-pressure supply device includes:
 a reservoir fluid passage connected to the reservoir not via the master cylinder;
 a pump device, as a high-pressure source, which is configured to pump up the working fluid stored in the reservoir via the reservoir fluid passage so as to pressurize the working fluid and to supply the pressurized working fluid to the wheel brakes;
 a pair of return fluid passages each of which connects a corresponding one of the wheel brakes to the reservoir or the reservoir fluid passage; and
 a pair of electromagnetic control valves which are provided respectively for the return fluid passages and each of which is configured to control a flow of the working fluid from a corresponding one of the wheel brakes to the reservoir in accordance with electric current supplied thereto.

* * * * *